(12) United States Patent
Taylor et al.

(10) Patent No.: US 8,025,941 B2
(45) Date of Patent: Sep. 27, 2011

(54) IG WINDOW UNIT AND METHOD OF MAKING THE SAME

(75) Inventors: Thomas J. Taylor, Northville, MI (US); Yei-Ping (Mimi) H. Wang, Troy, MI (US); Desaraju V. Varaprasad, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 1001 days.

(21) Appl. No.: 11/290,812

(22) Filed: Dec. 1, 2005

(65) Prior Publication Data
US 2007/0128449 A1    Jun. 7, 2007

(51) Int. Cl.
*B32B 17/06* (2006.01)
*B32B 15/00* (2006.01)

(52) U.S. Cl. .......... 428/34; 428/432; 428/426; 428/434; 428/433; 428/699; 428/701; 428/702

(58) Field of Classification Search .................. 428/428, 428/432, 446, 448, 698, 699, 701, 702
See application file for complete search history.

(56) References Cited

U.S. PATENT DOCUMENTS

| | | |
|---|---|---|
| 3,682,528 A | 8/1972 | Apfel et al. |
| 4,853,264 A | 8/1989 | Vincent et al. |
| 4,898,790 A | 2/1990 | Finley |
| 4,965,121 A | 10/1990 | Young et al. |
| 5,156,894 A | 10/1992 | Hood et al. |
| 5,251,064 A | 10/1993 | Tennant et al. |
| 5,306,547 A | 4/1994 | Hood et al. |
| 5,308,662 A | 5/1994 | Woodard et al. |
| 5,332,618 A | 7/1994 | Austin |
| 5,371,138 A | 12/1994 | Schaefer et al. |
| 5,510,173 A | 4/1996 | Pass et al. |
| 5,514,476 A | 5/1996 | Hartig et al. |
| 5,557,462 A | 9/1996 | Hartig et al. |
| 5,563,734 A | 10/1996 | Wolfe et al. |
| 5,784,853 A | 7/1998 | Hood et al. |
| 5,800,933 A | 9/1998 | Hartig et al. |
| 5,837,108 A | 11/1998 | Lingle et al. |
| 5,840,161 A | 11/1998 | Woodard et al. |
| 5,902,505 A | 5/1999 | Finley |
| 5,935,702 A | 8/1999 | Macquart et al. |
| 5,981,059 A | 11/1999 | Bright et al. |
| 6,014,872 A | 1/2000 | Hartig et al. |
| 6,030,671 A | 2/2000 | Yang et al. |
| 6,261,693 B1 | 7/2001 | Veerasamy |

(Continued)

FOREIGN PATENT DOCUMENTS

WO    WO 01/66482    9/2001

(Continued)

OTHER PUBLICATIONS

U.S. Appl. No. 10/922,235, filed Oct. 25, 2004.

(Continued)

*Primary Examiner* — Ling Xu
(74) *Attorney, Agent, or Firm* — Nixon & Vanderhye P.C.

(57) ABSTRACT

An insulating glass (IG) window unit, and/or a method of making the same is/are provided. The IG window unit includes two spaced apart substrates that are separated from one another by at least one seal and/or spacer. One of the substrates supports both a solar management coating for blocking significant amounts of infrared (IR) radiation and a coating for blocking amounts of ultraviolet (UV) radiation.

19 Claims, 3 Drawing Sheets

U.S. PATENT DOCUMENTS

| | | |
|---|---|---|
| 6,277,480 B1 | 8/2001 | Veerasamy et al. |
| 6,280,834 B1 | 8/2001 | Veerasamy et al. |
| 6,303,225 B1 | 10/2001 | Veerasamy |
| 6,368,470 B1 | 4/2002 | Woodard |
| 6,632,491 B1 | 10/2003 | Thomsen et al. |
| 6,649,212 B2 | 11/2003 | Payne et al. |
| 6,936,347 B2 | 8/2005 | Laird et al. |
| 2003/0190476 A1 | 10/2003 | Veerasamy et al. |
| 2004/0009356 A1 | 1/2004 | Medwick et al. |
| 2005/0134959 A1 | 6/2005 | Simpson et al. |
| 2005/0145480 A1 | 7/2005 | Neuman et al. |
| 2005/0208319 A1 | 9/2005 | Finley et al. |

FOREIGN PATENT DOCUMENTS

| | | |
|---|---|---|
| WO | WO 01/66483 | 9/2001 |
| WO | WO 02/04375 | 1/2002 |

OTHER PUBLICATIONS

U.S. Appl. No. 11/029,025, filed Jan. 5, 2005.
U.S. Appl. No. 11/229,837, filed Sep. 20, 2005.

IG WINDOW UNIT AND METHOD OF MAKING THE SAME

This invention relates to an insulating glass (IG) window unit, and/or a method of making the same. In certain embodiments, the IG window unit includes first and second substrates (e.g., glass substrates) spaced apart from one another, wherein the first and/or second substrate supports a solar management coating such as a low-E (low emissivity) coating for blocking at least some infrared (IR) radiation and an ultraviolet (UV) radiation blocking coating for blocking at least some UV radiation.

BACKGROUND OF THE INVENTION

IG window units are known in the art. For example, see U.S. Pat. Nos. 6,014,872; 5,800,933; 5,784,853; 5,557,462; 5,514,476; 5,308,662; 6,632,491; 5,306,547; and 5,156,894, all of which are hereby incorporated herein by reference. An IG window unit typically includes at least first and second substrates spaced apart from one another by at least one spacer and/or seal. The gap or space between the spaced apart substrates may or may not be filled with a gas (e.g., argon) and/or may or may not be evacuated to a pressure less than atmospheric pressure in different instances.

Many conventional IG window units include low-E coating (e.g., multi-layer coating including at least one IR reflecting layer such as a silver-based layer for reflecting at least some infrared radiation) on an interior surface of one of the two substrates. While such IG units enable significant amounts of infrared (IR) radiation to be blocked so that it does not reach the interior of the building (apartment, house, office building, or the like), such IG units are typically lacking in means for blocking UV radiation. In other words, the low-E coatings provided on IG units while capable of blocking satisfactory amounts of IR radiation are often not capable of blocking as much UV radiation as would be desired.

In view of the above, it can be seen that there exists a need in the art for an IG window unit that is capable of blocking both (a) significant amounts of IR radiation, and (b) significant amounts of UV radiation, so that the blocked amounts of IR and UV radiation do not reach the interior of the building in which the IG window unit is mounted. In certain embodiments, there may also exist a need in the art for a method of making such an IG window unit.

Commonly owned U.S. Pat. No. 6,632,491 is incorporated herein by reference, and includes a low-E coating on one substrate and a UV blocking coating on the other substrate of an IG unit. However, it will be appreciated that in the '491 Patent the low-E and UV coatings are on opposite substrates, thereby requiring IG window fabricators to use two pieces of coated glass (which is more prone to damage) for each IG unit.

It will be appreciated that there exists a need in the art for an IG window unit that is capable of blocking both (a) significant amounts of IR radiation, and (b) significant amounts of UV radiation, so that the blocked amounts of IR and UV radiation do not reach the interior of the building in which the IG window unit is mounted, and is also designed so that IG window fabricators can manufacture such windows with less risk of damage. In certain embodiments, there may also exist a need in the art for a method of making such an IG window unit.

BRIEF SUMMARY OF EXAMPLE EMBODIMENTS OF THE INVENTION

In certain example embodiments of this invention, an IG window unit is provided that is capable of blocking both (a) significant amounts of IR radiation, and (b) significant amounts of UV radiation, so that the blocked amounts of IR and UV radiation do not reach the interior of the building in which the IG window unit is provided. In certain example embodiments, a single substrate (e.g., glass substrate) supports both a low-E (low emissivity) coating and a UV blocking coating thereon, so that the UV blocking coating is provided over the low-E coating on the substrate. By providing both the low-E coating and the UV blocking coating on the same substrate, it is possible for the IG window fabricator to make an IG window unit using only one coated glass substrate thereby reducing the risk of damage during the manufacturing process (the other glass substrate(s) may either be not coated at all, or may be coated with a scratch resistant coating or the like). It will be appreciated that low-E and UV coatings are rather susceptible to damage such as scratching during the manufacturing and handling process.

In certain example embodiments of this invention, there is provided a IG window unit comprising: a first glass substrate supporting a solar management multi-layer coating (e.g., low-E coating); a second glass substrate spaced apart from the first glass substrate, wherein one of the first and second substrates supports both a solar management multi-layer coating and a UV blocking coating including at least one layer, wherein the UV blocking coating is located over the solar management coating on the one substrate; wherein the solar management coating comprises at least one IR blocking layer comprising Ag, at least one dielectric layer provided between the IR blocking layer and the one substrate, and at least another dielectric layer provided over the IR blocking layer, and wherein the solar management coating has an emissivity ($E_n$) of no greater than 0.10 and/or a sheet resistance ($R_s$) of no greater than 8 ohms/square; wherein the UV blocking coating blocks at least 50% of UV radiation from 300 to 380 nm; and wherein the IG window unit has a visible transmission of at least about 60%, and blocks at least about 80% of UV radiation from 300-380 nm.

DETAILED DESCRIPTION OF EXAMPLE EMBODIMENTS OF THE INVENTION

Figure 1:
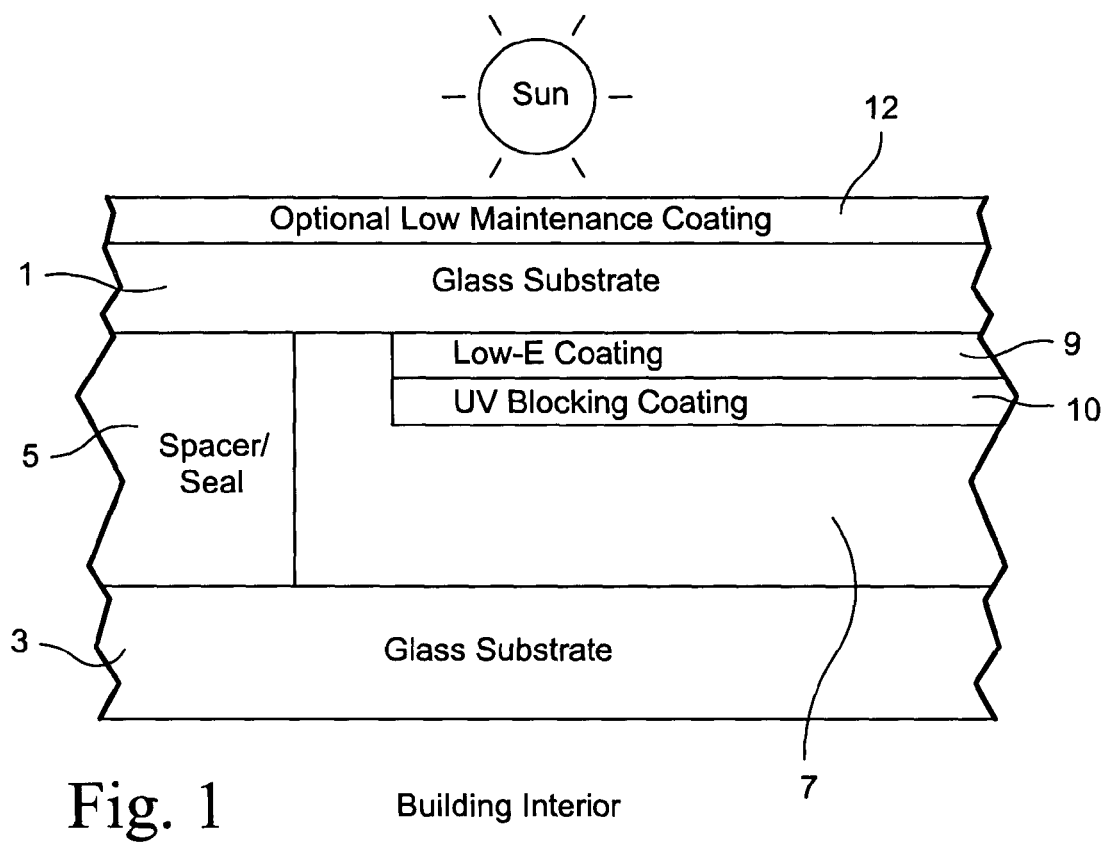
FIG. 1 is a cross sectional view of part of an IG window unit according to an example embodiment of this invention.

Referring now more particularly to the accompanying drawings in which like reference numerals indicate like parts throughout the several views.

Certain example embodiments of this invention relate to an IG window unit including at least first and second spaced apart substrates (e.g., glass or plastic substrates having at least some visible transmission) that are separated from one another by at least one seal and/or spacer. The first and/or second substrate supports a solar management coating such as a low-E (low-emissivity) coating for blocking at least some infrared (IR) radiation and a UV blocking coating for blocking at least some ultraviolet (UV) radiation. In certain example embodiments, a single substrate (e.g., glass substrate) of the IG unit supports both a low-E coating and a UV blocking coating, so that the UV blocking coating is provided over the low-E coating on the substrate. It has been found that the unit is much more durable if the UV blocking coating is located over the more stable low-E coating, as opposed to the other way around. By providing both the low-E coating and the UV blocking coating on the same substrate, it is possible for the IG window fabricator to make an IG window unit using only one coated glass substrate thereby reducing the risk of damage during the manufacturing process (the other glass substrate(s) may either be not coated at all, or may be coated with a scratch resistant coating or the like). It will be appreciated that low-E and UV coatings are rather susceptible to damage such as scratching during the manufacturing and handling process.

While the UV blocking coating is located over the more stable low-E coating in certain example embodiments, this invention is not so limited. In other example embodiments of this invention, the low-E or solar management coating may be deposited (e.g., sputter-deposited) over the UV blocking coating.

With regard to how much IR and UV radiation is blocked, in certain example non-limiting embodiments of this invention the low-E coating may have an emissivity ($E_n$) of no greater than about 0.10 and/or a sheet resistance ($R_s$) of no greater than about 8 ohms/square, whereas the UV blocking coating may block at least 50% of UV radiation from 300 to 380 nm.

FIG. 1 is a cross sectional view of a portion of an IG window unit according to an example embodiment of this invention. As shown in FIG. 1, the IG window unit includes first substrate 1 and second substrate 3 that are spaced apart from one another at least by one or more peripheral seal(s) or spacer(s) 5. Optionally, an array of spacers (not shown) may be provided between the substrates in a viewing area of the window for spacing the substrates from one another as in the context of a vacuum IG window unit. The spacer(s) 5, other spacer(s), and/or peripheral seal space the two substrates 1 and 3 apart from one another so that the substrates do not contact one another and so that a space or gap 7 is defined therebetween. The space 7 between the substrates 1, 3 may be evacuated to a pressure lower than atmospheric in certain example embodiments, and/or may be filled with a gas (e.g., Ar) in certain example embodiments. Alternatively, space 7 between the substrates 1, 3 need not be filled with a gas and/or need not be evacuated to a low pressure. In certain example embodiments, it is possible to suspend foil or other radiation reflective sheet(s) (not shown) in space 7. When substrate(s) 1 and/or 3 are of glass, each glass substrate may be of the soda-lime-silica type of glass, or any other suitable type of glass, and may be for example from about 1 to 10 mm thick in certain example embodiments of this invention.

Figure 4:
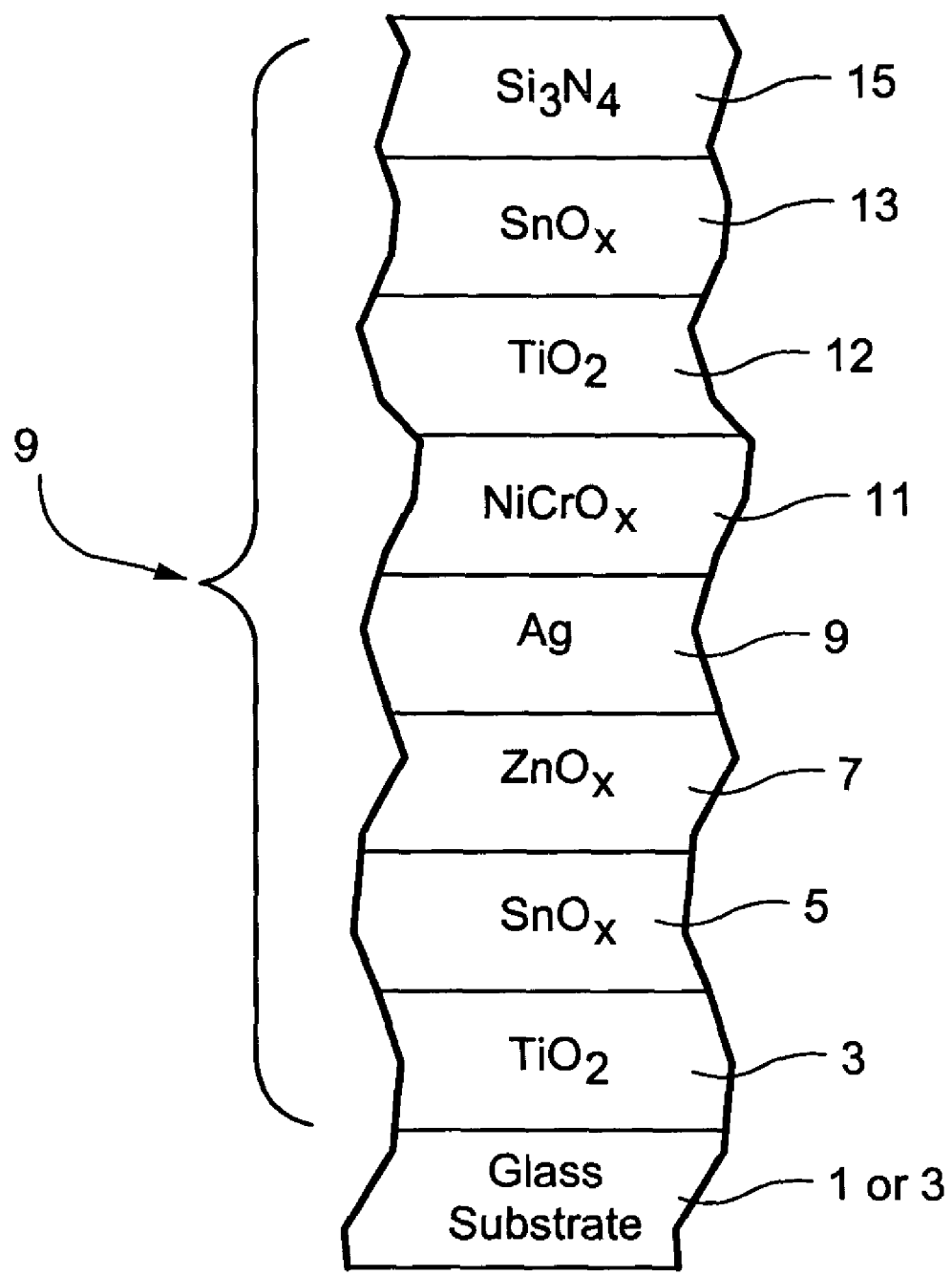
FIG. 4 is a cross sectional view of an example low-E coating that may be used in any of the embodiments of FIGS. 1-3.

The IG window unit of FIG. 1 includes a low-E coating 9 that is supported by substrate 1. Low-E coating 9 includes one or more layers, although in many embodiments it is a multi-layer coating including at least one IR blocking layer (e.g., layer based on Ag, Au, or some other IR reflecting metal(s)) sandwiched between at least a pair of dielectric layers. Since one example function of low-E or solar management coating 9 is to block (i.e., reflect and/or absorb) certain amounts of IR radiation and prevent the same from reaching the building (or vehicle) interior, the coating 9 includes at least one IR blocking (i.e., IR reflecting and/or absorbing) layer. Example IR blocking layer(s) which may be present in coating 9 are of or include silver (Ag), nickel-chrome (NiCr), gold (Au), and/or any other suitable material that blocks significant amounts of IR radiation. It will be appreciated by those skilled in the art that IR blocking layer(s) of coating 9 need not block all IR radiation, but only need to block significant amounts thereof. In certain embodiments, each IR blocking layer (there may be more than one in the coating 9) is provided between at least a pair of dielectric layers. Example dielectric layers include silicon nitride, titanium oxide, silicon oxynitride, tin oxide, and/or other types of metal-oxides and/or metal-nitrides. In certain example embodiments, in addition to being between a pair of dielectric layers, each IR blocking layer may also be provided between a pair of contact layers of or including a material such as an oxide and/or nitride of nickel-chrome, titanium, or any other suitable material. An example non-limiting low-E coating 9 which may be provided on substrate 1 is illustrated in FIG. 4, and is more fully discussed below. Of course, low-E/solar management coatings 9 herein are not limited to the illustrated coating, and any other suitable solar management coating capable of blocking amounts of IR radiation may instead be used. Low-E coating 9 may be deposited on substrate(s) 1 and/or 3 in any suitable manner, including but not limited to sputtering, vapor deposition, and/or any other suitable technique.

Still referring to FIG. 1, the IG window unit further includes UV blocking coating 10 for blocking significant amounts of UV radiation. In the FIG. 1 embodiment, the UV blocking coating is provided on the same glass substrate 1 as is the low-E coating. In particular, the UV blocking coating 10 is provided over the low-E coating 9 on the glass substrate 1.

UV blocking coating 10 may be, for purposes of example and without limitation, any suitable commercially available UV blocking coating such as a UV blocking coating available from Guardian Industries, Corp., Auburn Hills, Mich., or a silica based UV blocking coating available from Tru-Vue, Inc., Chicago, Ill. UV blocking coating 10 includes at least one layer, and blocks at least some UV radiation. For example and without limitation, any of the coatings described and/or illustrated in any of U.S. Pat. Nos. 5,332,618 or 5,371,138 (both incorporated herein by reference) may also be used as a UV blocking coating 10 in certain embodiments of this invention. In certain example embodiments of this invention, UV blocking coating 10 prevents at least about 50% of UV radiation (300-380 nm) reaching the same from passing therethrough, more preferably at least about 70%, even more preferably prevents at least about 80% of UV radiation reaching the same from passing therethrough, and most preferably prevents at least about 90% of UV radiation reaching the same from passing therethrough. In other words, UV blocking coating 10 preferably blocks at least about 50% of UV radiation (i.e., from 300-380 nm), more preferably at least about 70% of UV radiation, even more preferably at least about 80%, and most preferably at least about 90% of UV radiation. UV blocking coating 10 may block UV radiation (from 300-380 nm) by, for example and without limitation, reflecting such UV radiation, absorbing such UV radiation, and/or converting amounts of such UV radiation into other type(s) of radiation (e.g., IR), and/or the like. It is noted that coating 10 is not limited to the precise coatings described above, as any suitable UV blocking coating may be used as coating 10 in different embodiments of this invention. UV blocking coatings 10 according to different embodiments of this invention may be formed in any suitable manner (e.g., via sputter coating, via vapor deposition, via capillary action, via roll(s) coating, and/or the like).

In certain example embodiments of this invention, the UV blocking coating 10 may be of or include a colloidal electro-conductive oxide solution having both infrared (IR) and ultra-violet (UV) blocking characteristics. In certain example embodiments of this invention, for UV blocking coating 10, a substantially transparent composite oxide coating is provided that includes a silica matrix, zinc antimonite, and a UV blocking material, thereby permitting the coating (e.g., applied via a coating sol) after application to block significant amounts of both IR and UV radiation. In certain example embodiments of this invention, a UV and IR blocking coating comprises each of cerium oxide and zinc antimonite in the form of nanoparticulate, and silicon oxide (e.g., $SiO_2$). It has surprisingly been found that such coatings are effective at blocking both UV and IR radiation, and also are resistant to high temperatures as spectral response remains substantially unchanged in certain example instances after one or two hours of substantial heating (e.g., to about 400 or 450 degrees C.). In certain example embodiments, the coated article has transmission for a wavelength of 2300 nm, of less than 10%. In certain example embodiments of this invention, the sol type coating comprises from about 15 to 50% cerium oxide (more preferably from about 20 to 45%, and most preferably from about 30 to 40%), from about 30 to 70% zinc antimonate (more preferably from about 35 to 65%, and most preferably from about 40 to 55%), and from about 5 to 35% silicon oxide (more preferably from about 10 to 30%, and most preferably from about 12 to 25%). It has been found that these amounts of such materials in the sol type coating provide a coating that is effective at blocking both UV and IR radiation, and is also are resistant to high temperatures. In the case where the colloidal antimony oxide is antimony oxide sol, the method of producing electroconductive anhydrdous zinc antimonate inclusive coatings according to certain example embodiments can be produced by, inter alia, mixing antimony oxide sol and a zinc compound, and then calcining the mixture at 300 to 680 degrees C. after drying. The zinc compound which can be used in certain example embodiments is at least one zinc compound selected from the group consisting of zinc hydroxide, zinc oxide, inorganic acid salts of zinc and organic salts of zinc. The inorganic acid salts of zinc include zinc carbonate, basic zinc carbonate, zinc nitrate, zinc chloride, zinc sulfate and the like. The organic acid salts of zinc include zinc formate, zinc acetate, zinc oxalate and the like. These zinc compounds may be those put on the market as industrial chemicals. When zinc hydroxide and zinc oxide are used, it is preferred that they have a primary particle diameter of 100 nm or less. In particular, the salts containing acids that vaporize upon calcination, for example, carbonate salts and organic acid salts, are preferred. They may be used alone or as admixtures of two or more of them. The colloidal antimony oxide which can be used is antimony oxide having a primary particle diameter of 100 nm or less and includes diantimony pentoxide sol, hexaantimony tridecaoxide sol, diantimony tetroxide hydrate sol, colloidal diantimony trioxide and the like. The diantimony pentoxide sol can be produced by known methods, for example, a method in which diantimony trioxide is oxidized, a method in which an alkali antimonate is dealkalized with ion exchange resin, a method in which sodium antimonate is treated with an acid, and/or the like. The hexaantimony tridecaoxide sol can be produced by a method in which diantimony trioxide is oxidized and the diantimony tetroxide hydrate sol can also be produced by a method in which diantimony trioxide is oxidized. The colloidal diantimony trioxide can be produced by a gas phase method in certain example instances. The use of such a coating 10 that blocks both UV and IR may permit, for example, the low-E coating 9 to be omitted in certain example embodiments of this invention, or alternatively may permit a lesser type of low-E coating such as a pyrolytic coating that blocks less IR to be used as coating 9 in still further example embodiments of this invention. It will thus be appreciated that the low-E coating 9 may be omitted in certain example embodiments of this invention.

In still further example embodiments of this invention, the UV coating 10 may be of or include any coating mentioned in U.S. Pat. No. 6,649,212, the disclosure of which is hereby incorporated herein by reference. For example, the UV blocking coating may comprise a UV-radiation absorbing compound, comprising: alternating repeat units of: (1) a first monomer derived from a compound having the general formula: $(CH_2OCHCH_2)—R_z—[(R_a(OR)_b—Si—O—Si—R_a(OR)_b)]_c—R_z—(CH_2OCHCH_2)$ wherein $(CH_2OCHCH_2)$ is an epoxy group, $R_z$ is an organic group bonded to a siloxane silicon atom and epoxy groups, $R_a$ is an organic group bonded to a silicon atom and comprises from one to six carbon atoms, $(OR)_b$ is an alkoxy-group wherein R is an organic radical having from one to six carbon atoms, a and b are each at least one, a+b are equal to 3, and c represents the number of Si—O—Si repeat units and is at least 1, and (2) a second monomer derived from an UV-absorbing aromatic compound having at least two aromatic hydroxyl groups reactive with epoxy groups on said first monomer. In certain example instances, the second monomer may be a di-, tri-, or tetrafunctional hydroxybenzophenone. In certain example instances, the second monomer may be 2, 2' dihydroxybenzophenone or 2, 2'-4, 4'tetrahydroxybenzophenone.

In still further example embodiments of this invention, the UV blocking coating 10 may be of any type discussed in U.S. Ser. No. 10/922,235, the disclosure of which is hereby incorporated herein by reference. For instance, there may be provided a UV blocking coating that allows for relatively lower temperature cross-linkage reactions between a UV-absorbent compound and an epoxy alkoxysilane. More specifically, UV-absorbent coatings on transparent substrates are formed by prepolymerizing a mixture consisting essentially of a hydroxy-benzophenone, an epoxyalkoxysilane and an organic catalyst at an elevated temperature of between about 40° C. to about 130° C. and for a time sufficient such that between about 30 to about 70% of the epoxyalkoxysilane moieties form ring-opened oligomers and polymers with degrees of polymerization of between about 2 to about 2000, and more preferably between about 2 to 200. Such prepolymerized mixture may then be coated onto the surface of a transparent substrate. Most preferably, the prepolymerized mixture is hydrolyzed prior to being coated onto the substrate in an alcoholic acidic solution. For example, as a UV-absorbent compound there is tetrahydroxybenzophenone. An example epoxyalkoxysilane is 3-glycidoxypropyl trimethoxysilane (sometimes hereinafter referenced more simply as "glymo"). It may be possible that prepolymerization be effected in the presence of a tertiary amine such as triethylamine (TEA) as the organic catalyst which is only one of many possible amine catalysts that one practiced in the art will recognize. In addition, it is also possible to use a basic alkoxide, ROM where M is an alkali metal or alkaline earth metal and RO is any suitable, soluble organic that will react with the glymo epoxy ring or with the $RSi(OR)_3$ group. Likewise, it is possible to use species such as $R_4NOH$ and $R_4POH$ as catalysts for the ring-opening oligomerization or polymerization of the epoxy group on glymo.

As shown in FIG. 1, IG units typically are characterized as having four surfaces. In particular, surface #1 faces the building exterior (where the sun is located in FIG. 1), surface #2 is the interior coated/uncoated surface of the same substrate 1 but faces the interior space/gap 7 of the IG unit, surface #3 is the interior coated/uncoated surface of the other substrate 3 facing the interior space/gap 7, and surface #4 faces the building interior. In the FIG. 1 embodiment, low-E coating 9 and UV blocking coating 10 are both provided on surface #2. This may be advantageous in that it permits much IR and UV radiation to be blocked before reaching space 7.

Figure 2:
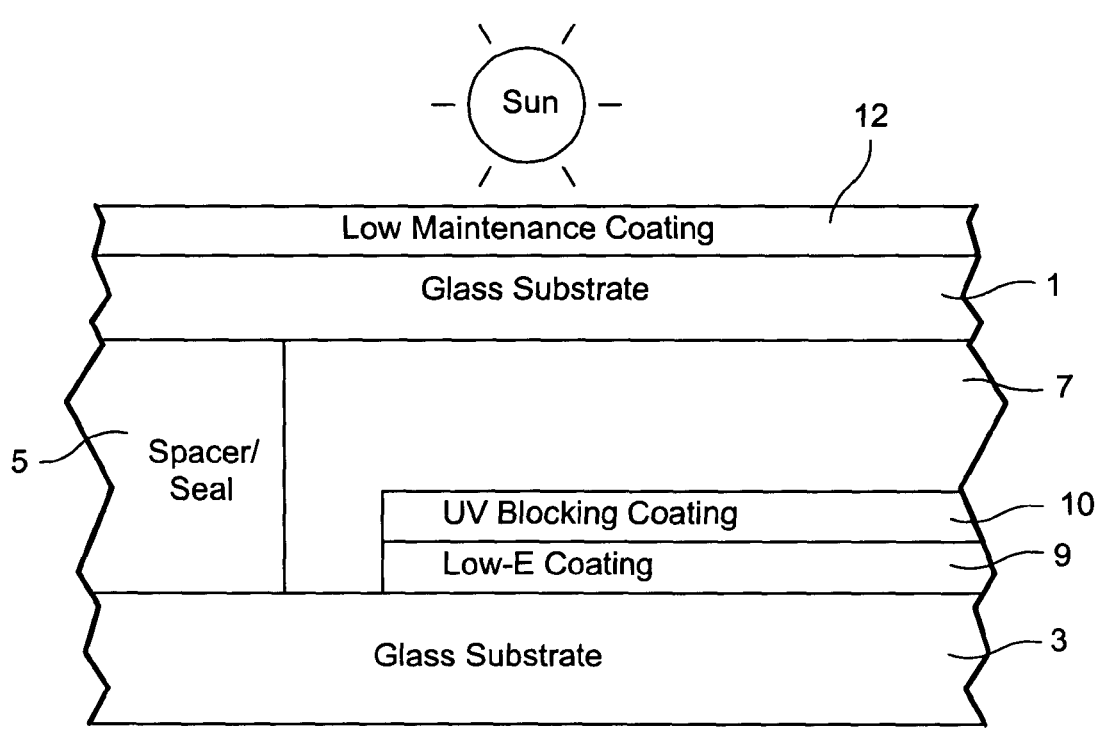
FIG. 2 is a cross sectional view of part of an IG window unit according to another example embodiment of this invention.

FIG. 2 is a cross sectional view of a portion of an IG window unit according to a different embodiment of this invention. The FIG. 2 embodiment is the same as the FIG. 1 embodiment discussed above, except that the low-E coating 9 and the UV blocking coating 10 are provided on the other glass substrate 3, and thus on surface #3 of the IG window unit.

Figure 3:
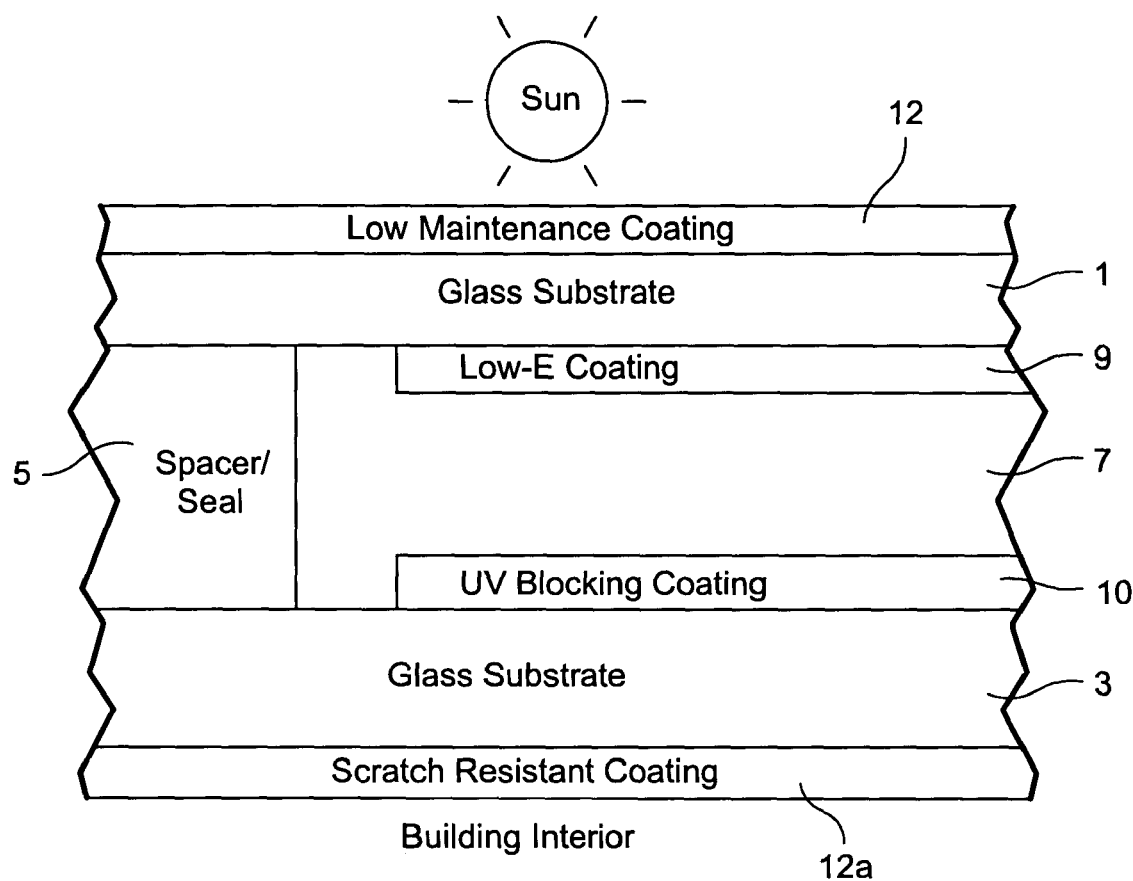
FIG. 3 is a cross sectional view of part of an IG window unit according to another example embodiment of this invention.

FIG. 3 is a cross sectional view of a portion of an IG window unit according to a different embodiment of this invention. The FIG. 3 embodiment is the same as the FIG. 1 embodiment discussed above, except that the low-E coating 9 and the UV blocking coating 10 are provided on opposite substrates 1 and 3.

Optionally, in any of the embodiments of FIGS. 1-3, a low maintenance coating 12 such as one or more layer(s) of or including diamond-like carbon (DLC) layer(s) may be provided on surface #1 as shown in FIGS. 1-3. DLC layer(s) 12 is of or includes diamond-like-carbon (DLC), and may include one or more layers. DLC layer(s) 12 is preferably partially or entirely amorphous in certain embodiments of this invention. Moreover, DLC layer(s) 12 preferably includes more $sp^3$ carbon-carbon bonds than $sp^2$ carbon-carbon bonds. In certain example embodiments, at least 50% of the carbon-carbon bonds in DLC layer(s) 12 are of the $sp^3$ type, more preferably at least about 60% of the carbon-carbon bonds in DLC layer(s) 12 are of the $sp^3$ type, and most preferably at least about 70% of the carbon-carbon bonds in DLC layer(s) 12 are of the $sp^3$ type. In certain example embodiments, the DLC layer(s) 12 has an average density of at least about 2.4 $gm/cm^3$, more preferably of at least about 2.7 $gm/cm^3$, and/or may have an average hardness of at least about 10 GPa (more preferably of at least about 20 GPa, and most preferably of at least about 30 GPa). In certain example embodiments, DLC layer(s) 12 may include other materials such as hydrogen, boron, silicon, oxygen, and/or the like. For example, DLC layer(s) 12 may include from about 5-25% hydrogen (H) in certain embodiments, more preferably from about 10-20% H. DLC layer(s) 12 may be hydrophobic (high contact angle), hydrophilic (low contact angle), or neither in different embodiments of this invention. For purposes of example only, DLC layer(s) 12 may be of or include any of the DLC inclusive layer(s) or coating systems described in any of U.S. Pat. Nos. 6,261,693, 6,277,480, 6,280,834, 6,303,225, and/or 6,284,377 (all of which are hereby incorporated herein by reference) in different embodiments of this invention. DLC layer(s) 12 may be deposited on the substrate 1 via an ion beam deposition technique, or any other suitable deposition process (e.g., see the processes described in the aforesaid patents, incorporated herein by reference). In certain example embodiments, it is possible that layer 12 may instead be a photocatalytic coating such as $TiO_2$, in certain example embodiments of this invention.

In alternative embodiments of this invention, DLC layer(s) 12 may instead, or in addition, be provided on surface #4l (i.e., on substrate 3) in a similar manner as shown by coating 12a in FIG. 3.

In view of the presence of both IR blocking coating (e.g., low-E coating) 9 and UV blocking coating 10, IG window units according to certain example embodiments of this invention as shown in FIGS. 1-3 may have the following solar characteristics (e.g., where the coated glass substrate 1 is a clear soda lime silica glass substrate from 2 to 3.2 mm thick, and the other soda lime silica glass substrate 3 is clear and from 2 to 3.2 mm thick). In Table 1 below, $R_gY$ is visible reflection from the outside or exterior of the window/building (i.e., from where the sun is located, and $R_fY$ is visible reflection from the interior side (e.g., from within the building interior), and the a*, b* values under these respective reflection parameters also correspond to glass (g) side (i.e., from outside the window in FIGS. 1-2) and film (f) side (i.e., from interior the window in FIGS. 1-2).

TABLE 1

IG Unit Solar Characteristics

| Characteristic | General | Preferred | More Preferred |
|---|---|---|---|
| $T_{vis}$ (or TY)(Ill. C, 2 deg.): | >=60% | >=68% | >=70% |
| $a*_t$ (Ill. C, 2°): | −10 to 10 | −5.0 to 0.0 | −3.5 to −1.5 |
| $b*_t$ (Ill. C, 2°): | −10 to 10 | −2.0 to 4.0 | 1.0 to 3.0 |
| $R_gY$ (Ill. C, 2 deg.): | 5 to 17% | 7 to 13% | 9 to 11% |
| $a*_g$ (Ill. C, 2°): | −8.0 to 8.0 | −3.0 to 2.0 | −2.0 to 0.5 |
| $b*_g$ (Ill. C, 2°): | −8.0 to 8.0 | −5.0 to 1.0 | −4.0 to −1.0 |
| $R_fY$ (Ill. C, 2 deg.): | 5 to 20% | 7 to 14% | 10 to 12% |
| $a*_f$ (Ill. C, 2°): | −8.0 to 8.0 | −3.0 to 2.0 | −1.5 to 0.5 |
| $b*_f$ (Ill. C, 2°): | −8.0 to 8.0 | −5.0 to 1.0 | −4.0 to −1.5 |
| SHGC: | <=0.50 | <=0.45 | <=0.40 |
| SC: | <=0.55 | <=0.49 | <=0.46 |
| U-value: | 0.10 to 0.40 | 0.20 to 0.30 | 0.22 to 0.25 |
| $T_{ultraviolet}$: | <=0.25 | <=0.15 | <=0.05 |
| $T_{UV\ damage\ weighted}$: | <=0.30 | <=0.20 | <=0.10 |

It is noted that certain parameters can be tuned by adjusting layer thicknesses. For example, ultraviolet (UV) transmission ($T_{ultraviolet}$) can be reduced further by adjusting dielectric thickness(es).

In certain embodiments of this invention, IG window units block at least about 80% of UV radiation at 300-380 nm thereby preventing the same from reaching the building interior (more preferably block at least about 90% of UV radiation at 300-380 nm, even more preferably block at least about 95% of UV radiation at 300-380 nm, and most preferably block at least about 97% of UV radiation at 300-380 nm thereby preventing the same from reaching the building interior). In other words, IG window units according to certain embodiments of this invention have a UV transmission from 300-380 nm of no greater than about 20%, more preferably no greater than about 10%, even more preferably no greater than about 5%, and most preferably no greater than about 3%.

FIG. 4 is a side cross sectional view of an example low-E coating 9 that may be provided on substrate 1 (or 3) in certain example embodiments of this invention. Substrate 1 (and/or 3) may be, for example and without limitation, clear, green, bronze, or blue-green glass from about 1.0 to 10.0 mm thick, more preferably from about 1.8 mm to 4 mm thick). As shown in FIG. 4, the low-E coating 9 may comprise dielectric layer 3, dielectric layer 5, zinc oxide inclusive layer 7, IR reflecting layer 9 including or of silver, gold, or the like, upper contact layer 11 of or including an oxide of nickel chrome (e.g., $NiCrO_x$), a layer 12 consisting of or comprising titanium oxide ($TiO_x$), a metal oxide inclusive layer 13, and dielectric layer 15 of or including a material such as silicon nitride and/or silicon oxynitride which may in certain example instances be a protective overcoat. Other layers and/or materials may also be provided in certain example embodiments of this invention, and it is also possible that certain layers may be removed or split in certain example instances. The bottom dielectric layer 3 may be of or include titanium oxide in certain example embodiments of this invention. The titanium oxide of layer 3 may in certain example instances be represented by $TiO_x$, where x is from 1.5 to 2.5, most preferably about 2.0. The titanium oxide may be deposited via sputtering or the like in different embodiments. In certain example instances, dielectric layer 3 may have an index of refraction (n), at 550 nm, of at least 2.0, more preferably of at least 2.1, and possibly from about 2.3 to 2.6 when the layer is of or includes titanium oxide. In certain embodiments of this invention, the thickness of titanium oxide inclusive layer 3 is controlled so as to allow a* and/or b* color values (e.g., transmissive, film side reflective, and/or glass side reflective) to be fairly neutral (i.e., close to zero) and/or desirable. Other materials may be used in addition to or instead of titanium oxide in certain example instances. In certain alternative embodiments, the Ti in oxide layer 3 may be replaced with another metal.

Dielectric layer 5 is optional, and may be of or include a metal oxide such as tin oxide in certain example embodiments of this invention. Metal oxide inclusive layer 5 may be provided in order to improve adhesion between titanium oxide layer 3 and zinc oxide layer 7 in certain example embodiments. The tin oxide layer 5 may be doped with other materials such as nitrogen in certain example embodiments of this invention. In certain instances, tin oxide inclusive layer 5 may be advantageous in that it may increase the throughput of the coater producing the coating or save costs, compared to if this portion of the coating was of titanium oxide or silicon nitride which are slower to sputter and/or more expensive (although these materials are also possible). Lower contact layer 7 in certain embodiments of this invention is of or includes zinc oxide (e.g., ZnO). The zinc oxide of layer(s) 7 may contain other materials as well such as Al (e.g., to form $ZnAlO_x$) in certain example embodiments. For example, in certain example embodiments of this invention, zinc oxide layer 7 may be doped with from about 1 to 10% Al (or B), more preferably from about 1 to 5% Al (or B), and most preferably about 2 to 4% Al (or B). The use of zinc oxide 7 under the silver in layer 9 allows for an excellent quality of silver to be achieved.

Infrared (IR) reflecting layer 9 is preferably substantially or entirely metallic and/or conductive, and may comprise or consist essentially of silver (Ag), gold, or any other suitable IR reflecting material. IR reflecting layer 9 helps allow the coating to have low-E and/or good solar control characteristics such as low emittance, low sheet resistance, and so forth. The IR reflecting layer may, however, be slightly oxidized in certain embodiments of this invention. In certain example embodiments of this invention, the target-to-substrate distance of the silver target (e.g., silver planar target) used in sputtering IR reflecting layer 9 is reduced compared to conventional practice. The upper contact layer 11 may be of or include an oxide of Ni and/or Cr. In certain example embodiments, upper contact layer 11 may be of or include nickel (Ni) oxide, chromium/chrome (Cr) oxide, or a nickel alloy oxide such as nickel chrome oxide ($NiCrO_x$), or other suitable material(s). The use of, for example, $NiCrO_x$ in this layer allows durability to be improved. The $NiCrO_x$ layer 11 may be fully oxidized in certain embodiments of this invention (i.e., fully stoichiometric), or alternatively may only be partially oxidized. In certain instances, the $NiCrO_x$ layer 11 may be at least about 50% oxidized. Contact layer 11 (e.g., of or including an oxide of Ni and/or Cr) may or may not be oxidation graded in different embodiments of this invention. Oxidation grading means that the degree of oxidation in the layer changes throughout the thickness of the layer so that for example a contact layer may be graded so as to be less oxidized at the contact interface with the immediately adjacent IR reflecting layer than at a portion of the contact layer(s) further or more/most distant from the immediately adjacent IR reflecting layer. Descriptions of various types of oxidation graded contact layers are set forth in U.S. Pat. No. 6,576,349, the disclosure of which is hereby incorporated herein by reference. Contact layer 11 (e.g., of or including an oxide of Ni and/or Cr) may or may not be continuous in different embodiments of this invention across the entire IR reflecting layer.

Titanium oxide layer 12 is provided on and over the IR reflecting layer 9, and directly on and contacting the contact layer 11 in the FIG. 4 embodiment. As explained herein, it has unexpectedly been found that the provision of a layer 12 consisting essentially of or comprising titanium oxide over IR reflecting layer 9 unexpectedly improves the quality of the IR reflecting layer thereby permitting the coated article to realized improved thermal and/or optical properties. The titanium oxide layer 12 may be stoichiometric ($TiO_2$) or non-stoichiometric in different embodiments of this invention. Dielectric layer 13 may be of or include a metal oxide such as tin oxide in certain example embodiments of this invention. Metal oxide inclusive layer 13 is provided for antireflection purposes, and also improves the emissivity of the coated article and the stability and efficiency of the manufacturing process. Moreover, tin oxide in layer 13 provides good adhesion to the titanium oxide in layer 12, and provides for good durability in this respect. The tin oxide layer 13 may be doped with other materials such as nitrogen in certain example embodiments of this invention. In certain instances, tin oxide inclusive layer 5 may be advantageous in that it may increase the throughput of the coater producing the coating or save costs, compared to if this portion of the coating was of titanium oxide or silicon nitride which are slower to sputter and/or more expensive (although these materials are also possible to replace the layer 13). Dielectric layer 15, which may be an overcoat in certain example instances, may be of or include silicon nitride (e.g., $Si_3N_4$) or any other suitable material in certain example embodiments of this invention such as silicon oxynitride. Optionally, other layers may be provided above layer 15. Layer 15 is provided for durability purposes, and to protect the underlying layers. In certain example embodiments, layer 15 may have an index of refraction (n) of from about 1.9 to 2.2, more preferably from about 1.95 to 2.05.

Other layer(s) below or above the illustrated coating 9 may also be provided. Thus, while the layer system or coating is "on" or "supported by" substrate 1 (directly or indirectly), other layer(s) may be provided therebetween. Thus, for example, the coating of FIG. 4 may be considered "on" and "supported by" the substrate 1 (or 3) even if other layer(s) are provided between layer 3 and substrate 1 (or 3). Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention. For example and without limitation, layer 5 and/or layer 13 may be removed in certain example situations.

While various thicknesses may be used in different embodiments of this invention for the example non-limiting low-E coating 9, example thicknesses and materials for the respective layers on the glass substrate 1 (or 3) in the FIG. 4 embodiment are as follows, from the glass substrate outwardly (e.g., the Al content in the zinc oxide layer 7 may be from about 1-10%, more preferably from about 1-3% in certain example instances):

TABLE 2

(Example Materials/Thicknesses; FIG. 4 Embodiment)

| Layer | Preferred Range (Å) | More Preferred (Å) | Example (Å) |
|---|---|---|---|
| TiO$_x$ (layer 3) | 30-400 Å | 80-250 Å | 180 Å |
| SnO$_2$ (layer 5) | 10-300 Å | 10-100 Å | 20 Å |
| ZnAlO$_x$ (layer 7) | 10-300 Å | 60-120 Å | 50 Å |
| Ag (layer 9) | 50-250 Å | 80-150 Å | 130 Å |
| NiCrO$_x$ (layer 11) | 10-80 Å | 20-70 Å | 30 Å |
| TiO$_x$ (layer 12) | 10-300 Å | 20-100 Å | 40 Å |
| SnO$_2$ (layer 13) | 40-400 Å | 100-200 Å | 160 Å |
| Si$_3$N$_4$ (layer 15) | 50-750 Å | 150-350 Å | 210 Å |

It is also noted that other low-E coatings 9 may instead be used in any of the embodiments of FIGS. 1-3. For example and without limitation, the solar management or low-E coatings described and/or illustrated in any of U.S. Pat. Nos. 6,632,491, 5,800,933, 5,837,108, 5,557,462, 6,014,872, 5,514,476, 5,935,702, 4,965,121, 5,563,734, 6,030,671, 4,898,790, 5,902,505, 3,682,528, or WO 01/66482, or WO 01/66483, may instead be used for coating 9 in any embodiment of this invention, all of these patent documents being incorporated herein by reference.

The materials, specific layers, and thicknesses for the coatings discussed above are for example only and are not intended to be limiting unless specifically claimed.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. An IG window unit comprising:
a first glass substrate supporting a solar management multi-layer coating;
a second glass substrate spaced apart from the first glass substrate,
wherein one of the first and second substrates supports both a solar management multi-layer coating and a UV blocking coating including at least one layer, wherein the UV blocking coating is located over and contacting the solar management coating on the one substrate;
wherein the solar management coating comprises at least one IR blocking layer comprising Ag, at least one dielectric layer provided between the IR blocking layer and the one substrate, and at least another dielectric layer provided over the IR blocking layer, and wherein the solar management coating has an emissivity (E$_n$) of no greater than 0.10 and/or a sheet resistance (R$_s$) of no greater than 8 ohms/square;
wherein the solar management coating is a sputter-deposited coating, and the UV blocking coating is not a sputter-deposited coating;
wherein the UV blocking coating blocks at least 50% of UV radiation from 300 to 380 nm; and
wherein the IG window unit has a visible transmission of at least about 60%, and blocks at least about 80% of UV radiation from 300-380 nm.

2. The IG window unit of claim 1, wherein the IG window unit blocks at least about 90% of UV radiation from 300-380 nm.

3. The IG window unit of claim 1, wherein the IG window unit blocks at least about 95% of UV radiation from 300-380 nm, and wherein the solar management coating and the UV blocking coating are supported by the first glass substrate which is to be located furthest from an interior of a building on which the IG window unit is to be located.

4. The IG window unit of claim 1, wherein the IG window unit blocks at least about 97% of UV radiation from 300-380 nm.

5. The IG window unit of claim 1, wherein the first and second glass substrates are spaced apart from one another by at least one spacer and/or edge seal so as to define a space between the substrates.

6. The IG window unit of claim 5, wherein the space between the substrates is filled with a gas and/or is evacuated to a pressure less than atmospheric.

7. The IG window unit of claim 1, wherein the IG window unit has a visible transmission of at least 70%.

8. The IG window unit of claim 1, wherein the dielectric layer provided between the IR blocking layer and the one substrate comprises one or more of zinc oxide and titanium oxide.

9. The IG window unit of claim 1, wherein the another dielectric layer provided over the IR blocking layer comprises one or more of titanium oxide, tin oxide, and silicon nitride, and wherein the solar management coating and the UV blocking coating are supported by the second glass substrate which is to be located closest to an interior of a building on which the IG window unit is to be located.

10. The IG window unit of claim 1, wherein the solar management coating has an emissivity (E$_n$) of no greater than 0.07 and a sheet resistance (R$_s$) of no greater than 5 ohms/square.

11. The IG window unit of claim 1, wherein the solar management coating comprises at least one contact layer comprising NiCrO$_x$ that contacts the IR blocking layer comprising Ag.

12. A window unit comprising:
a first substrate supporting a solar management coating and a UV blocking coating;
a second substrate spaced apart from the first substrate;
wherein the solar management coating comprises at least one IR blocking layer, at least one dielectric layer provided between the IR blocking layer and the first substrate, at least another dielectric layer provided over the IR blocking layer;
wherein the solar management coating is a sputter-deposited coating, and the UV blocking coating is not a sputter-deposited coating, the UV blocking coating being located over and contacting the solar management coating on the first substrate; and
wherein the window unit has a visible transmission of at least about 60%, and blocks at least about 80% of UV radiation from 300-380 nm.

13. The window unit of claim 12, wherein the solar management coating supported by the first substrate has an emissivity (E$_n$) of no greater than 0.10 and/or a sheet resistance (R$_s$) of no greater than 8 ohms/square, and wherein the IR blocking layer comprises at least one of Ag, Au and Ni.

14. The window unit of claim 12, wherein the solar management coating comprises another IR blocking layer comprising at least one of Ag, Au and Ni, and where the another dielectric layer is provided between the IR blocking layers.

15. The window unit of claim 14, wherein the IR blocking layers each comprise Ag, and wherein the UV blocking coating is located over the solar management coating.

16. The window unit of claim 12, wherein the window unit blocks at least about 95% of UV radiation from 300-380 nm.

17. The window unit of claim 12, wherein the solar management coating supported by the first substrate has an emissivity ($E_n$) of no greater than 0.07 and a sheet resistance ($R_s$) of no greater than 5 ohms/square.

18. The window unit of claim 12, wherein the window unit has a visible transmission of at least 70%, and wherein the first substrate is to be located closer to an interior of a building on which the window unit is to be provided than is the second substrate, and wherein a hydrophilic coating comprising DLC is provide on an exterior surface of the second substrate.

19. A window unit comprising:

a first substrate;

a second substrate spaced apart from the first substrate, wherein one of the substrates supports a solar management coating and a UV blocking coating, the UV blocking coating located over and contacting the solar management coating;

wherein the solar management coating is a sputter-deposited coating, and the UV blocking coating is not a sputter-deposited coating;

wherein the solar management coating supported by the first substrate has an emissivity ($E_n$) of no greater than 0.20 and/or a sheet resistance ($R_s$) of no greater than 20 ohms/square; and wherein the window unit has a visible transmission of at least about 60%, and blocks at least about 80% of UV radiation from 300-380 nm.

* * * * *